(12) United States Patent
Johansson et al.

(10) Patent No.: US 9,200,905 B2
(45) Date of Patent: Dec. 1, 2015

(54) HANDLING OF ERRORS IN MAP DATA

(75) Inventors: Oskar Johansson, Stockholm (SE);
Maria Södergren, Segeltorp (DE);
Fredrik Roos, Segeltorp (SE)

(73) Assignee: SCANIA CV AB (SE)

( * ) Notice: Subject to any disclaimer, the term of this patent is extended or adjusted under 35 U.S.C. 154(b) by 0 days.

(21) Appl. No.: 14/131,964

(22) PCT Filed: Jul. 2, 2012

(86) PCT No.: PCT/SE2012/050754
§ 371 (c)(1),
(2), (4) Date: Jan. 10, 2014

(87) PCT Pub. No.: WO2013/012377
PCT Pub. Date: Jan. 24, 2013

(65) Prior Publication Data
US 2014/0214318 A1    Jul. 31, 2014

(30) Foreign Application Priority Data
Jul. 15, 2011 (SE) ........................................ 1100537

(51) Int. Cl.
*G01C 21/20* (2006.01)
*G01C 21/32* (2006.01)
(Continued)

(52) U.S. Cl.
CPC ................ *G01C 21/20* (2013.01); *G01C 21/32* (2013.01); *G09B 29/006* (2013.01); *G09B 29/106* (2013.01)

(58) Field of Classification Search
CPC ...... G01C 21/20; G01C 21/32; G09B 29/006; G09B 29/106

USPC .................................................. 701/450, 532
See application file for complete search history.

(56) References Cited

U.S. PATENT DOCUMENTS

| | | | | |
|---|---|---|---|---|
| 6,856,897 B1 * | 2/2005 | Phuyal | .................... | G06T 17/05 340/995.24 |
| 8,284,995 B2 | 10/2012 | Diaz et al. | ..................... | 382/104 |

(Continued)

FOREIGN PATENT DOCUMENTS

| | | | |
|---|---|---|---|
| DE | 10 2008 012 697 | * | 6/2009 |
| DE | 10 2008 012 697 A1 | * | 6/2009 |

(Continued)

OTHER PUBLICATIONS

International Search Report mailed Nov. 15, 2012 in corresponding PCT International Application No. PCT/SE2012/050754.

*Primary Examiner* — Yonel Beaulieu
*Assistant Examiner* — Aaron L Troost
(74) *Attorney, Agent, or Firm* — Ostrolenk Faber LLP

(57) ABSTRACT

A system for handling errors in map data $D_{map}$. Information I related to map data $D_{map}$ is determined by a determination unit. An identification unit then identifies at least one error in the map data $D_{map}$ on the basis of the information I determined. Thereafter a storage unit stores data D related to the at least one error identified in map data $D_{map}$. A data providing unit can then at least partly disregard the map data $D_{map}$ including the error, when supplying map data $D_{map}$, so that the stored data D may instead be used in decision making. The risk of decisions being based on erroneous map data $D_{map}$ may thus be minimized.

15 Claims, 2 Drawing Sheets

Figure 1:
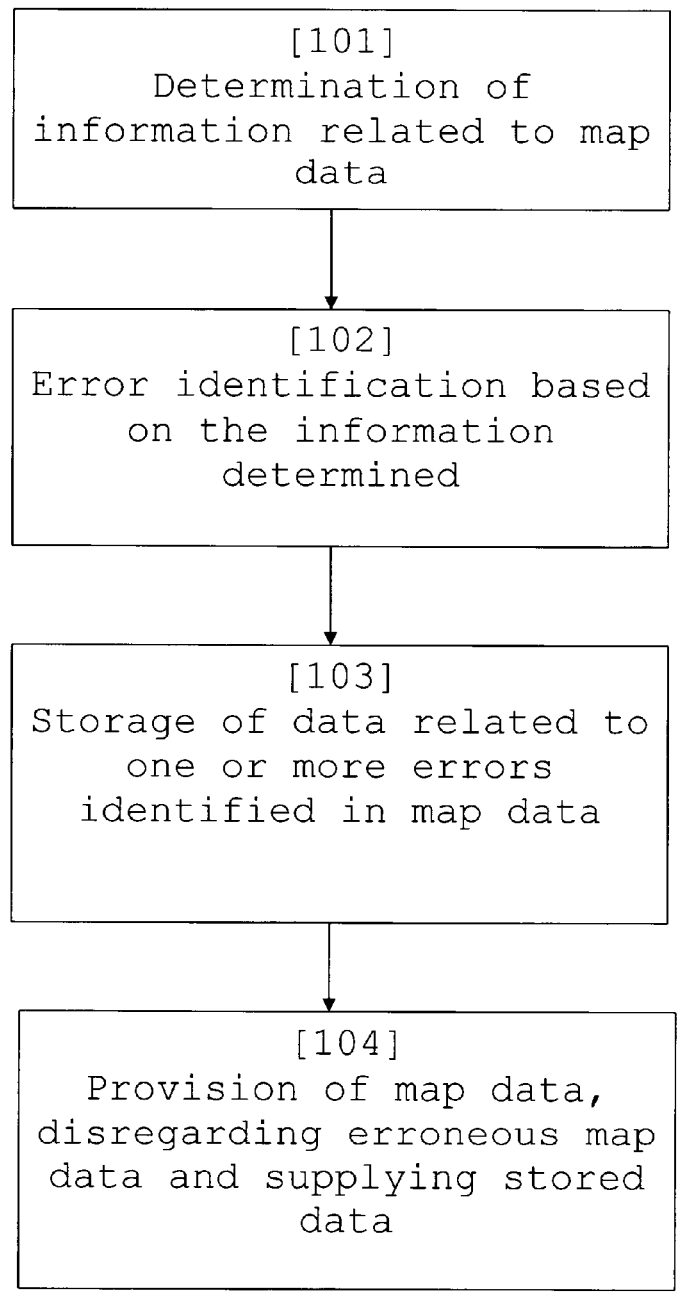

(51) Int. Cl.
*G09B 29/00* (2006.01)
*G09B 29/10* (2006.01)

(56) References Cited

U.S. PATENT DOCUMENTS

| | | | |
|---|---|---|---|
| 2005/0283699 A1 | 12/2005 | Nomura et al. | 714/746 |
| 2007/0198156 A1* | 8/2007 | Yamada | 701/49 |
| 2008/0071465 A1* | 3/2008 | Chapman | G01C 21/3691 701/117 |
| 2009/0070031 A1* | 3/2009 | Ginsberg | G01C 21/32 701/532 |
| 2010/0324752 A1* | 12/2010 | Suganuma et al. | 701/1 |

FOREIGN PATENT DOCUMENTS

| | | |
|---|---|---|
| DE | 10 2009 018 073 A1 | 1/2010 |
| WO | WO 2009/074206 A1 | 6/2009 |

* cited by examiner

HANDLING OF ERRORS IN MAP DATA

CROSS-REFERENCE TO RELATED APPLICATIONS

The present application is a 35 U.S.C. §§371 national phase conversion of PCT/SE2012/050754, filed Jul. 2, 2012, which claims priority of Swedish Patent Application No. 1100537-8, filed Jul. 15, 2011, the contents of which are incorporated by reference herein. The PCT International Application was published in the English language.

TECHNICAL FIELD

The present invention relates to a system in a vehicle for handling of errors in map data.

BACKGROUND

In today's vehicles, map data are used in many areas of application. One such area is for navigation by means of a positioning system, e.g. a GPS (global positioning system). Another such area is for estimation of running resistance for a vehicle. In such estimations, map data related to road gradients $\alpha$ are very important. Another such area is in today's economical cruise controls which take account inter alia of the running resistance, which itself depends inter alia on the road gradient $\alpha$. Another such area is various systems for automatic gear changing, in which gear choice is for example based on road gradients $\alpha$. Map data related to road curvature are also used by various systems.

Today's traditional cruise controls maintain a constant reference speed $v_{ref}$ which corresponds to the speed $v_{set}$ chosen by the driver. The value of the reference speed $v_{set}$ is only altered when the driver adjusts the set speed $v_{set}$ while driving. Certain economical cruise controls, e.g. Scania's Ecocruise, try to estimate a current running resistance and also have knowledge of the historical running resistance.

An experienced driver of a vehicle without cruise control can reduce fuel consumption by adapting his/her driving to the characteristics of the road ahead so that unnecessary braking and/or fuel-consuming acceleration can be avoided. A further development of the aforesaid economical cruise controls tries to mimic the experienced driver's adaptive driving on the basis of knowledge of the road ahead so that fuel consumption can be kept as low as possible, since this very greatly affects profitability for an owner of the vehicle, e.g. a haulage company or the like.

An example of such a further development of an economical cruise control is a "Look Ahead" cruise control (LACC), i.e. a strategic cruise control which uses knowledge of road sections ahead, i.e. knowledge of the nature of the road ahead, to determine the reference speed $v_{ref}$. Here the reference speed $v_{ref}$ is therefore allowed, within a certain speed range, to differ from the set speed $v_{set}$ chosen by the driver, in order to run the vehicle in a way which saves more fuel.

Knowledge of the road section ahead may for example comprise prevailing topography, road curvature, traffic situation, roadworks, traffic density, state of road, speed limits on the road section ahead, and traffic signs beside the road. This knowledge may for example be obtained from location information, e.g. GPS (global positioning system) information, map data and/or topographical map data, weather reports, weather measurements, information communicated between different vehicles and information communicated by radio. These different types of knowledge may be used in various ways. For example, knowledge of a speed limit on the road ahead may be used to achieve fuel efficiency by reducing the vehicle's speed before the lower speed zone is reached. Similarly, knowledge of a road sign conveying information about, for example, a roundabout or intersection ahead may also be used for fuel efficiency by braking before reaching the roundabout or intersection.

With an intelligent cruise control which takes account of topography ahead, i.e. a Look Ahead cruise control, the vehicle's reference speed $v_{ref}$ can therefore be optimised for different types of road, engine performance and train weight in order to achieve fuel saving if this is prioritised. A more powerful vehicle can also be achieved if this is prioritised, as in the "power mode" application. A higher mean speed can also be achieved without increasing the fuel consumption.

An economical cruise control may for example predict the vehicle's speed along a horizon of any suitable length, e.g. about 1-2 km. The vehicle's future speed along the horizon may be predicted in various ways, such as driving with a traditional cruise control with a reference speed $v_{ref}$ which is the same as the set speed $v_{set}$, or varying the reference speed $v_{ref}$ relative to the set speed $v_{set}$.

A Look Ahead cruise control (LACC) does for example allow the reference speed $v_{ref}$ to be raised, before an upgrade, to above the set speed $v_{set}$, since the vehicle will presumably lose speed on the upgrade owing to high train weight relative to engine performance. Similarly, the LACC allows the reference speed $v_{ref}$ to drop to below the set speed $v_{set}$ before a downgrade on which the vehicle will presumably be accelerated by its train weight. The concept here is that it is better from a fuel economy perspective to take advantage of the vehicle's acceleration by its own weight downhill than to initially accelerate before the downgrade and then brake on the downgrade. The LACC can thus reduce fuel consumption without greatly affecting journey time.

There are also cruise controls which use a current running resistance as a basis for deciding how the vehicle's speed should vary. In such cruise controls, the reference speed $v_{ref}$ can be allowed to deviate from the set speed $v_{set}$ on the basis of at least one characteristic of the running resistance, e.g. its magnitude and/or pattern over time.

Examples of known systems for handling map data are described in e.g. DE102008012697, US2005283699 and DE102009018073.

BRIEF DESCRIPTION OF THE INVENTION

In this specification, the invention is primarily exemplified for use in, or in combination with, a cruise control system, e.g. a Look Ahead cruise control (LACC), i.e. a strategic cruise control which can use knowledge of the nature of the road ahead to control the reference speed $v_{ref}$. The invention may however be implemented in, or in combination with, substantially any cruise control which uses map data.

The present invention may also be used in substantially all systems on board the vehicle which use map data, e.g. the aforesaid navigation systems, running resistance estimation systems and automatic gearchange systems.

Map data $D_{map}$ may contain errors, e.g. erroneous representations of road gradients $D_{map,\alpha}$, erroneous speed limits, erroneous representations of road signs or other kinds of error.

Errors in map data $D_{map}$ may lead to wrong decisions being taken by systems on board the vehicle or by the driver. Such decisions may result in the vehicle not being run in an optimum way.

For example, erroneous topographical data $D_{map,top}$ may lead to economical cruise controls taking decisions which are not optimum for fuel consumption, or to a gear change in an automatic gearchange system being not effected, being effected unnecessarily or being effected at a wrong time.

An object of the present invention is to propose a system which handles errors in map data $D_{map}$ so that the risk of wrong decisions by, for example, vehicle drivers and/or systems is reduced.

This object is achieved by the system for handling of errors in map data herein disclosed.

Using the present invention prevents decisions from being for example taken by systems such as those for automatic gearchanging, navigation and cruise control on the basis of erroneous map data $D_{map,error}$. According to the invention, either the erroneous map data $D_{map,error}$ are wholly or partly disregarded at the time of the provision of map data $D_{map}$ for on-board decision making, i.e. when map data $D_{map}$ are supplied to systems which present them for the driver or systems which take decisions based on them, or the driver or these systems are instead provided with correct estimated data $D_{est}$ corresponding to the erroneous map data $D_{map,error}$. The systems may then use these correct estimated data $D_{est}$ as a basis for their decisions, and/or present these correct estimated data $D_{est}$ instead of erroneous map data $D_{map,error}$.

Erroneous map data $D_{map,error}$ can be identified in various different ways according to different embodiments of the present invention.

For example a speed or speed variation predicted by an economic cruise control may be compared with an actual measured speed or speed variation for a road segment. If they differ, errors in map data $D_{map}$ can be identified, since the predicted speed is calculated on the basis of map data $D_{map}$, e.g. is based inter alia on the road gradient α.

Correct estimated values $D_{est,\alpha}$, e.g. for the road gradient α, may also be compared with corresponding map data $D_{map,\alpha}$, e.g. for the gradient α of the same road segment. If they differ, the system may conclude that map data $D_{map,\alpha}$ contain errors. Moreover, the correct estimate $D_{est,\alpha}$ of the gradient α may subsequently be used instead of the erroneous map data $D_{map,error}$, making it possible to take better-founded and more optimised decisions and reducing the risk of wrong decisions. Here and throughout this specification the road gradient α means the actual road gradient.

Errors in map data $D_{map}$ are, according to the invention, identified entirely on the basis of map data $D_{map}$, by comparing map data $D_{map}$ for adjacent road segments to see whether they differ in such a way that those for at least one of the segments may be assumed to be erroneous.

BRIEF LIST OF DRAWINGS

Figure 2:
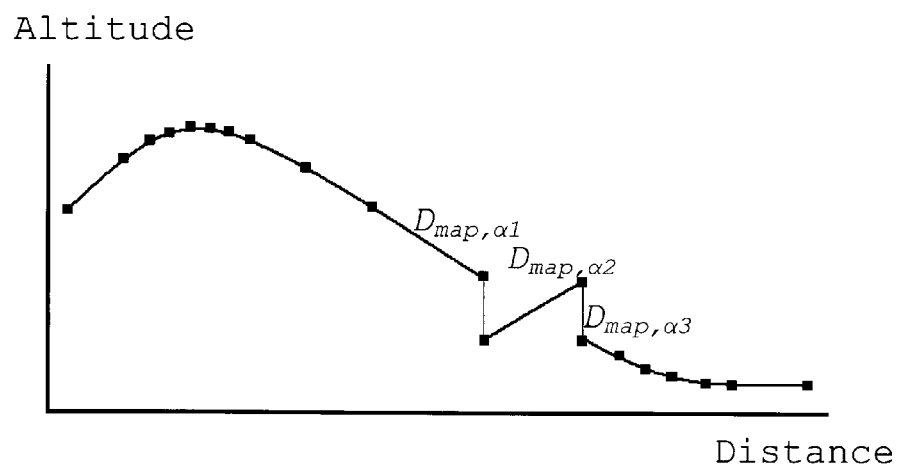
Figure 3:
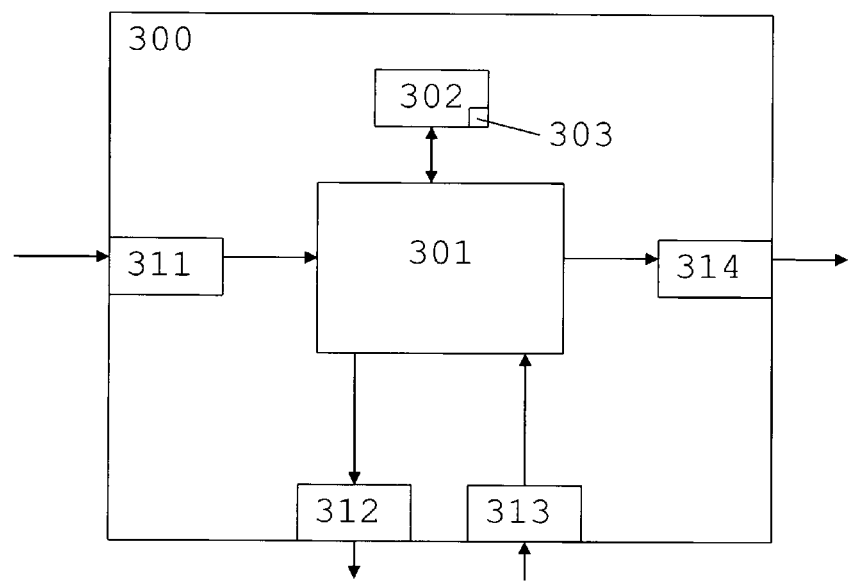

The invention is explained in more detail below with reference to the attached drawings, in which the same reference notations are used for similar items, and in which FIG. 1 is a flowchart corresponding to the method according to the invention, FIG. 2 depicts an example of map data $D_{map}$ for gradients α on a stretch of road, and FIG. 3 depicts a control unit which works according to the method of the invention.

DESCRIPTION OF PREFERRED EMBODIMENTS

According to the present invention, errors in map data $D_{map}$ are identified. FIG. 1 is a flowchart for the method according to the invention. As a first step 101 of the method, the system for error handling determines by means of a determination unit a piece of information I which is related to map data $D_{map}$. As a second step 102 of the method, an identification unit then identifies one or more errors in the map data $D_{map}$ on the basis of the information I determined. As a third step 103 of the method, data D related to the one or more errors identified in the map data $D_{map}$ are stored by a storage unit.

As a fourth step 104 of the method, map data $D_{map}$ are provided so that decisions can be taken by systems and/or the driver on board and/or outside the vehicle. At the time of this provision of data and consequently in such decisions, erroneous map data $D_{map}$ are at least partly disregarded and the stored data D are adopted instead.

The stored data D which are related to errors in map data $D_{map}$ may thus be used instead in decision making on board, i.e. they may be used by the driver or by one or more systems on board or outside the vehicle which use map data $D_{map}$, in order to take better-founded decisions or to actually refrain from taking decisions where there are errors. The present invention prevents an error in map data $D_{map}$ from causing recurrent wrong decisions. Erroneous map data $D_{map}$ are therefore at least partly disregarded, in favour of stored data D, by systems on board and/or outside the vehicle which take decisions based on map data and/or by systems on board which present the driver with map data as a basis for his/her decisions.

The present invention thus relates to a system for handling of errors in map data $D_{map}$. This system comprises a determination unit, an identification unit, a storage unit and a providing unit. The determination unit is adapted to determining information I related to map data $D_{map}$ as described above in relation to the method according to the invention. The identification unit is adapted to identifying at least one error in map data $D_{map}$ and, as described above, to basing such identification on the information I determined. The storage unit is adapted to storing data D related to at least one error in map data $D_{map}$, as described above in relation to the method according to the invention. The providing unit is adapted to supplying the stored data D to decision-making systems and/or a presentation unit which presents the stored data D to a decision-making driver.

According to an embodiment of the present invention, stored data D comprise the information I determined. This information I may therefore here initially be saved temporarily until an error has been identified, and may then be used in the storage of data D.

The stored data D comprise according to an embodiment one or more from among a location of the system where the error was identified, a direction in which the system was moving when the error was identified, and a distance over which the error was observed. One or more from among location, direction and distance may here for example be comprised in the information I determined which is related to map data $D_{map}$ if this information is saved temporarily until an error is identified, for subsequent use in the storage of data D.

The fact that the storage unit stores the geographical location of the error identified is very important for being able to effectively use the identification of the error.

The fact that the storage unit stores the direction of the system's movement, corresponding to the direction of a vehicle in which the system is installed, is important inter alia in identification of errors in road gradients α or road signs, since the error may be identified in only one direction of travel. For example, the error in map data $D_{map}$ for a road gradient α may consist in its representation being inverted, in which case it is advantageous to know the direction in which the error is identified.

FIG. 2 depicts a schematic example of an inverted map data gradient $D_{map,\alpha2}$ for a road segment which is part of a journey. The road altitude curve shows that there very probably are erroneous map data $D_{map,\alpha2}$ for a segment of the downgrade, since there are abrupt jumps in the map data gradient $D_{map,\alpha}$ between $D_{map,\alpha1}$, $D_{map,\alpha2}$ and $D_{map,\alpha3}$ in the mutually adjacent first, second and third segments. In this example the map data gradient $D_{map,\alpha2}$ for the middle segment has probably been inverted, as also depicted in FIG. 2. This conclusion may be drawn from the diagram on the basis that the whole pattern is here depicted. When the system is in the particular segment where the inverted map data gradient $D_{map,\alpha2}$ is situated, however, it is difficult to see that an actual inversion has taken place if the direction of travel is not also saved.

According to the invention described in more detail below, the determination of the information I by the determination unit may be based on comparison of two mutually adjacent road segments whereby a first map data gradient $D_{map,\alpha1}$ for a first segment is compared with a second map data gradient $D_{map,\alpha2}$ for a second segment. According to this embodiment, it is therefore sufficient to look at the map data jump between two ($D_{map,\alpha1}$ and $D_{map,\alpha2}$, or $D_{map,\alpha2}$ and $D_{map,\alpha3}$) of the three map data gradients $D_{map,\alpha1}$, $D_{map,\alpha2}$, and $D_{map,\alpha3}$ illustrated in FIG. 2.

The error in map data $D_{map}$ may for example also result in an erroneous representation of a road sign indication in one direction of travel but a correct indication in the other direction. Storing the direction of the system's movement therefore provides important information which may be needed for identifying and/or correcting erroneous map data $D_{map}$.

The fact that the storage unit stores the stretch of road on which the error is observed is advantageous in making it possible to determine the extent of the error, which is of course relevant for the driver and/or the systems which take decisions based on map data $D_{map}$.

According to an embodiment of the present invention, the data D stored by the system for error handling comprises estimated data $D_{est}$ which have been used for identifying at least one error in map data $D_{map}$. For example, the identification of one or more errors in map data $D_{map}$ may be done by the identification unit using an estimate $D_{est,\alpha}$ of a gradient $\alpha$ for a road segment. This estimate $D_{est,\alpha}$ of the gradient is here stored by the system when an error in map data $D_{map}$ for the gradient is identified. This storage of the estimate $D_{est,\alpha}$ may either be effected immediately by the storage unit when the error is identified, i.e. the first time the system passes the location of the erroneous map data, or on a later occasion when the system passes the same location.

When hopefully correctly estimated data $D_{est}$, e.g. data $D_{est,\alpha}$ corresponding to an actual road gradient $\alpha$, have been stored, the system can, the next time it passes the respective location and/or road segment, use the stored hopefully correctly estimated data $D_{est}$ instead of the erroneous map data $D_{map}$. The system uses for example GPS coordinates to keep track of whether it is near to a location where erroneous map data $D_{map}$ have been identified. Recurrence of wrong decisions due to errors in map data $D_{map}$ is thus avoided.

The non-limitative example here described of erroneous map data $D_{est,\alpha}$ for the road gradient $\alpha$ is described in more detail below.

The determination by the identification unit of the information I related to map data $D_{map}$ is based on comparison between a predicted speed variation for at least one road segment and an actual speed variation for the same at least one road segment. An economical cruise control, e.g. a Look Ahead cruise control (LACC), can predict a speed variation for a road segment ahead on the basis inter alia of topographical map data $D_{map, top}$ e.g. road gradient data $D_{map,\alpha}$. According to this embodiment, the predicted speed variation is compared with the actual speed variation, and if they differ, the difference is assumed to be due to one or more errors in map data $D_{map}$.

In other words, as the LACC's speed prediction depends on map data $D_{map}$, errors in map data can therefore be identified if the prediction proves to be incorrect, i.e. it differs from the actual speed. The result is very effective identification of errors in map data $D_{map}$. The identification is also very computationally efficient in that the LACC still predicts the speed for road segments ahead when determining the reference speed $v_{ref}$ which the vehicle should apply.

The vehicle's speed may for example be predicted as $$v = \dot{v}*dt \quad (eq. 1)$$

in which
$\dot{v}$ is the vehicle's acceleration $$\dot{v} = \frac{1}{m_v}(F_{drive} - F_{air} - F_{roll} - F_{grav} - F_{brake}),$$

dt is the time between two speed samples,
$m_v$ is the vehicle's weight,
$F_{drive}$ is the vehicle's driving force,
$F_{air}$ is the vehicle's air resistance,
$F_{roll}$ is the vehicle's rolling resistance,
$F_{grav}$ is the gravitational force which acts upon the vehicle in horizontal directions, and
$F_{brake}$ is the braking force acting upon the vehicle's wheels.

Several of the forces which act upon the vehicle can be determined on the basis of map data $D_{map}$. For example, the rolling resistance $F_{roll}$ and the gravitational force $F_{grav}$ depend on the road gradient $\alpha$, which at the time of prediction is taken from map data $D_{map,\alpha}$.

According to an embodiment of the present invention, the determination unit bases the determination of the information I related to map data $D_{map}$ on comparison of a gradient $\alpha$, taken from map data $D_{map,\alpha}$ for a road segment, with an estimate $D_{est,\alpha}$ of the gradient $\alpha$ for the same road segment. Map data $D_{map,\alpha}$ for the gradient $\alpha$ are thus here compared with a hopefully correct estimate $D_{est,\alpha}$ which may be made by the system for identification of errors in map data $D_{map}$ or by any other suitable system, e.g. on board a vehicle, or be estimated by any suitable on-board system which uses the road gradient $\alpha$ in its function or in its calculations.

The estimate $D_{est,\alpha}$ of the road gradient $\alpha$ which is needed for identifying the error in map data $D_{map}$ may here be comprised in the stored data D. This means that this estimate $D_{est,\alpha}$ of the gradient $\alpha$ can later be used by the vehicle instead of map data $D_{map,\alpha}$ for the gradient $\alpha$ identified as erroneous.

The road gradient $\alpha$ may be estimated in various ways, e.g. by at least one from among a force equation method (described in relation to equation 2 below), an accelerometer method (described in relation to equation 3 below) or an altitude change method. According to an embodiment of the invention, any suitable combination of two or more of these three methods may be used in estimating the road gradient $\alpha$.

The altitude change method may for example use information from GPS and/or gyro in cases where the length of the segment is known, e.g. because of the sampling interval being known. The road gradient $\alpha$ may then be calculated by trigonometry, since the altitude change over a distance travelled is known.

An estimate of the road gradient α may for example be made as follows when the gradient is relatively slight such that sin α≈α:

$$\alpha = \frac{m_v * \dot{v} - F_{drive} + F_{roll} + F_{air} + F_{brake}}{m_v * g} \quad (eq.\ 2)$$

in which
$m_v$ is the vehicle's weight,
$\dot{v}$ is the vehicle's acceleration;
$F_{drive}$ is the vehicle's driving force,
$F_{roll}$ is the vehicle's rolling resistance,
$F_{air}$ is the vehicle's air resistance,
$F_{brake}$ is the braking force acting upon the vehicle's wheels, and
g is the acceleration due to gravity.

The estimate $D_{est,\alpha}$ of the road gradient α may thus be compared with a gradient α indicated in map data $D_{map,\alpha}$ to decide whether there are errors in map data $D_{map}$.

According to an embodiment of the present invention, the road gradient α is estimated as above when a steady state prevails and/or there are relatively high train weights for the vehicle, since this results in more accurate estimates $D_{est,\alpha}$. An example of a steady state is when the vehicle maintains a constant speed, i.e. when no acceleration is taking place. High train weights may here mean for example weights over 15 tons.

In the case of vehicles equipped with an accelerometer, the road gradient α in cases where it is relatively slight such that sin α≈α may also be estimated by means of the accelerometer as follows $$\alpha = \frac{accelerometer - a_{wheel}}{g} \quad (eq.\ 3)$$

in which
accelerometer represents the acceleration value from the accelerometer,
$a_{wheel}$ is a calculated wheel acceleration, and
g is the acceleration due to gravity.

One skilled in the art will appreciate that other methods for estimation $D_{est,\alpha}$ of the road gradient α may also be used in conjunction with the present invention.

According to an embodiment of the invention, such data $D_{est,\alpha}$ for the road gradient α estimated by any of the above methods is then used instead of the erroneous map data $D_{map,\alpha}$ so long as the error in said map data $D_{map}$ remains. The result is more correct data $D_{est,\alpha}$ for the gradient α for systems which use the road gradient α, e.g. Look Ahead cruise control (LACC), automatic gearchange systems, navigation systems or any other suitable systems which use the road gradient α for their function.

For map data $D_{map}$ other than the road gradient α it is also possible for estimated data $D_{est}$ arrived at by the determination unit for the determination of the information I related to map data to be stored for later use instead of the identified erroneous map data $D_{map}$.

The fact that using estimated data $D_{est}$ corresponding to the erroneous map data $D_{map}$ prevents wrong decisions from being made repeatedly on the basis of an error in map data $D_{map}$ proves to be highly advantageous, e.g. for a driver who does the same journey often and has previously suffered from recurrent bad decisions based on the map error concerned each time he/she has passed the respective location.

According to another embodiment of the present invention, the determination unit bases the determination of the information I related to map data $D_{map}$ on comparison of map data $D_{map,\alpha1}$ for a first gradient $\alpha_1$ of a first road segment with map data $D_{map,\alpha2}$ for a second gradient $\alpha_2$ of a second road segment, the two segments being mutually adjacent. Map data $D_{map,\alpha1}$, $D_{map,\alpha2}$ for two gradients $\alpha_1$, $\alpha_2$ of two consecutive road segments are thus compared. The information I related to map data which is then determined indicates whether $D_{map,\alpha1}$, $D_{map,\alpha2}$ for these two gradients $\alpha_1$, $\alpha_2$ are correct, and this determination is based on how great the difference between the gradients is at the meeting point of the two segments. If the change is unreasonably large, i.e. the meeting point marks a jump/step/discontinuity of the gradient α (as depicted in FIG. 2), map data $D_{map,\alpha1}$, $D_{map,\alpha2}$ for at least one of the gradients $\alpha_1$, $\alpha_2$ are deemed erroneously represented. This determination of the information I related to map data $D_{map}$ can be done very quickly, since all the data come from map data $D_{map}$ and no estimates of road gradients α need be made.

As indicated above, one or more errors in map data $D_{map}$ may be related to topographical map data $D_{map,top}$, e.g. gradients α in a road segment. The error in map data $D_{map,error}$ may also be related to one or more from among a road sign, a speed limit, a radius of curvature, a tunnel, an increase in the number of traffic lanes, a loadbearing class for a road, a road class/carriageway class (type of road, e.g. motorway or national highway), or a height limit for a road (e.g. because of a tunnel or a bridge across the road).

According to an embodiment of the present invention, map data $D_{map}$ for one or more road segments are disregarded when at least one error in map data $D_{map}$ is identified at the time of their provision. This at least avoids decisions being taken on the basis of erroneous map data $D_{map,error}$ if there is no access to correct estimated data $D_{est}$ corresponding to the respective erroneous map data $D_{map,error}$.

According to an embodiment, map data $D_{map}$ are disregarded for a predetermined stretch of road S comprising a location where the one or more errors in them are identified. The risk of using erroneous map data $D_{map,error}$ is thus minimised, since the error presumably applies at only one point/location on the road. Using this embodiment minimises the risk of wrong decisions due to inadequate map data $D_{map}$, since no decision is taken where map data $D_{map}$ are of doubtful quality. The length of the predetermined stretch of road may for example be about 2 km, in which case map data $D_{map}$ are disregarded for about 1 km on each side of the point where erroneous map data $D_{map,error}$ are identified.

According to an embodiment of the invention, the stored data D are supplied to at least one external unit at the time of provision. These one or more external units may comprise one or more from among at least one vehicle, at least one server for storage of map information, and at least one provider of map information. In other words, the system may for example communicate to other vehicles or share with them its correct estimated data $D_{est}$ which correspond to erroneous map data $D_{map}$. It may also communicate/share the correct estimated data $D_{est}$ to/with a central unit, e.g. a server, which may then pass them on to any suitable number of other vehicles. This central unit may then also receive correctly estimated information from several different systems for handling of errors in map data $D_{map}$, i.e. from several different vehicles. Thereafter the central unit may combine these estimated data $D_{est}$ from various systems and also do a quality classification of these estimated data. This results for example in a classification of high quality if several different vehicles report substantially the same estimated value for the data $D_{est}$.

Such a quality classification may also be used when storing estimated data $D_{est}$. The central unit may for example be instructed to only store data which are of higher quality than those already stored at the time. There is thus no risk of an earlier estimate which is of high quality being replaced by a later estimate which is of low quality.

One skilled in the art will appreciate that the system for handling of errors in map data $D_{map}$ according to the present invention may also be implemented in a computer program which, when executed in a computer, causes the computer to apply the method described above. The computer program usually takes the form of a computer programme program product 303 (in FIG. 3) stored on a digital storage medium, and is contained in such a product's computer-readable medium which comprises a suitable memory, e.g. ROM (read-only memory), PROM (programmable read-only memory), EPROM (erasable PROM), flash memory, EEPROM (electrically erasable PROM), a hard disc unit, etc.

FIG. 3 depicts schematically a control unit 300 comprising a calculation unit 301 which may take the form of substantially any suitable type of processor or microcomputer, e.g. a circuit for digital signal processing (digital signal processor, DSP), or a circuit with a predetermined specific function (application specific integrated circuit, ASIC). The calculation unit 301 is connected to a memory unit 302 which is situated in the control unit 300 and which provides the calculation unit with, for example, the stored programme code and/or stored data which the calculation unit needs to enable it to perform calculations. The calculation unit is also adapted to storing partial or final results of calculations in the memory unit 302.

The control unit 300 is further provided with respective devices 311, 312, 313, 314 for receiving and sending input and output signals. These input and output signals may comprise waveforms, pulses or other attributes which the input signal receiving devices 311, 313 can detect as information and which can be converted to signals which the calculation unit 301 can process. These signals are then supplied to the calculation unit. The output signal sending devices 312, 314 are arranged to convert signals received from the calculation unit 301 in order, e.g. by modulating them, to create output signals which can be conveyed to other parts of the system for handling of errors in map data.

Each of the connections to the respective devices for receiving and sending input and output signals may take the form of one or more from among a cable, a data bus, e.g. a CAN (controller area network) bus, an MOST (media oriented systems transport) bus or some other bus configuration, or a wireless connection.

One skilled in the art will appreciate that the aforesaid computer may take the form of the calculation unit 301 and that the aforesaid memory may take the form of the memory unit 302.

One skilled in the art will also appreciate that the above system may be modified according to the various embodiments of the method according to the invention. The invention relates also to a motor vehicle, e.g. a truck or a bus, provided with at least one system for handling of errors in map data according to the invention.

The present invention is not restricted to its embodiments described above but relates to and comprises all embodiments within the protective scope of the attached claims.

The invention claimed is:

1. A system for handling errors in map data ($D_{map}$), comprising
   a processor configured for determining first information ($I_1$) related to map data ($D_{map}$), and for labeling erroneous map data ($D_{map,\ error}$) comprising at least one error in said map data ($D_{map}$) with said first information ($I_1$) determined, and
   a memory configured for storage of data (D) related to said at least one labeled error in map data ($D_{map}$), wherein
   said processor is further configured for at least partly disregarding said erroneous map data ($D_{map,\ error}$), at decision making on board a first vehicle, and for instead providing said stored data (D), including estimated data ($D_{est}$), to at least one of a decision making system and a driver of said first vehicle,
   said processor is further configured for labeling an error included in said at least one error with said first information ($I_1$), a determination of said error included in said at least one error being performed by a comparison of a first road gradient ($D_{map,\ \alpha 1}$) obtained from said map data ($D_{map}$) for a first road segment with a second road gradient ($D_{map,\ \alpha 2}$) obtained from said map data ($D_{map}$) for a second road segment, wherein said first and second road segments are mutually adjacent,
   said processor is further configured for storing second information ($I_2$), which comprises at least one of: a location of said first vehicle, a direction in which said first vehicle is moving, and a distance traveled by said first vehicle since the last recorded location of said first vehicle included in said second information ($I_2$), said second information ($I_2$) being stored temporarily until said error included in said at least one error is determined, for subsequent use of at least a portion of said second information ($I_2$) in said stored data (D), and
   said at least portion of said second information ($I_2$) is used as a basis for said stored data (D) when said error included in said at least one error is determined, said stored data (D) including said first information ($I_1$), said first information ($I_1$) comprising at least one of: a location of said first vehicle when said error included in said at least one error was determined, a direction in which said first vehicle was moving when said error included in said at least one error was determined, and a distance traveled by said first vehicle over which said error included in said at least one error was observed,
   said first information ($I_1$) being used to select a portion of said estimated data ($D_{est}$), which corresponds to said erroneous map data ($D_{map,\ error}$), to be provided to at least one of a decision making system and a driver of said first vehicle by said processor, instead of said erroneous map data ($D_{map,\ error}$), which includes said error included in said at least one error.

2. The system according to claim 1, in which said at least one error is related to topographical map data ($D_{map,\ top}$).

3. The system according to claim 2, in which said topographical map data ($D_{map,\ top}$) comprise an erroneous representation of a road gradient ($\alpha$).

4. The system according to claim 1, in which an estimate ($D_{est,\ \alpha}$) of the road gradient ($\alpha$) for a road segment is determined by at least one of:
   an accelerator method,
   a force equation method, and
   an altitude change method.

5. The system according to claim 1, in which said stored data (D) comprise estimated data ($D_{est}$), and said processor is configured for providing said estimated data ($D_{est}$) instead of the erroneous map data ($D_{map,\,error}$) labeled, for decision making on board said vehicle.

6. The system according to claim 5, in which said processor is configured for supplying said estimated data ($D_{est}$) to at least one further system which is configured for communicating with said system for handling of errors in said map data ($D_{map}$), and for using said estimated data ($D_{est}$), instead of said erroneous map data ($D_{map,\,error}$), so long as said at least one labeled error in said map data ($D_{map}$) remains.

7. The system according to claim 1, in which said processor is configured for disregarding said erroneous map data ($D_{map,\,error}$) at the time of supplying said map data ($D_{map}$) to at least one further system which communicates with said system for handling of errors in said map data ($D_{map}$), when at least one error in said map data ($D_{map}$) has been labeled.

8. The system according to claim 7, in which said processor is configured for disregarding said erroneous map data ($D_{map,\,error}$) for a predetermined stretch of road (S) comprising a location for which said at least one error in said map data ($D_{map}$) is labeled.

9. The system according to claim 1, in which said processor is configured for supplying said stored data (D) to at least one of the following external units:
- at least one second vehicle,
- at least one server for storage of map information, and
- at least one provider of map information.

10. The system according to claim 1, which system is contained in or interacts with an economical cruise control.

11. The system according to claim 1, in which said processor is configured for supplying said stored data (D) to at least one of:
- at least one system on board a second vehicle which takes decisions based on said stored data (D),
- at least one system outside said first vehicle which takes decisions based on said stored data (D), and
- a display configured for presenting said stored data (D) for a driver of said first vehicle for him/her to take decisions based on said stored data (D).

12. The system according to claim 1, wherein said processor provides said estimated data ($D_{est}$) for said map data ($D_{map}$) when said first road gradient ($D_{map,\,\alpha1}$) and said second road gradient ($D_{map,\,\alpha2}$) differ by more than a predetermined amount.

13. The system according to claim 1, wherein said system is on board said first vehicle.

14. A system for handling errors in map data ($D_{map}$), comprising
- a processor configured for determining first information ($I_1$) related to map data ($D_{map}$), and for labeling erroneous map data ($D_{map,\,error}$) comprising at least one error in said map data ($D_{map}$) with said first information ($I_1$) determined, and
- a memory configured for storage of data (D) related to said at least one labeled error in map data ($D_{map}$), wherein said processor is further configured for at least partly disregarding said erroneous map data ($D_{map,\,error}$), at decision making on board a vehicle, and for instead providing said stored data (D) to at least one of a decision making system and a driver of said vehicle, said processor is further configured for labeling an error included in said at least one error with said first information ($I_1$), a determination of said error included in said at least one error being performed by a comparison of a parameter for a road segment obtained from said map data ($D_{map}$) with an estimate of said parameter ($D_{est}$) for said road segment; and said stored data (D), provided to at least one of said decision making system and/or to and said driver of said vehicle, includes said estimate of said parameter ($D_{est}$), said parameter for said road segment is one of:
- a road sign,
- a speed limit,
- a radius of curvature,
- a tunnel,
- a changing number of traffic lanes,
- a loadbearing class for a road,
- a road class,
- a height limit for a road, and
- a point of interest (POI), said processor is further configured for storing second information ($I_2$), which comprises at least one of: a location of said vehicle, a direction in which said vehicle is moving, and a distance traveled by said vehicle since the last recorded location of said vehicle included in said second information ($I_2$), said second information ($I_2$), being stored temporarily until said error included in said at least one error is determined, for subsequent use of at least a portion of said second information ($I_2$) in said stored data (D), and said at least portion of said second information ($I_2$) is used as a basis for said stored data (D) when said error included in said at least one error is determined, said stored data (D) including said first information ($I_1$), said first information ($I_1$) comprising at least one of: a location of said vehicle when said error included in said at least one error was determined, a direction in which said vehicle was moving when said error included in said at least one error was determined, and a distance traveled by said vehicle over which said error included in said at least one error was observed, said first information ($I_1$) being used to select said estimate of said parameter ($D_{est}$), which corresponds to said erroneous map data ($D_{map,\,error}$), to be provided to at least one of a decision making system and a driver of said vehicle by said processor, instead of said erroneous map data ($D_{map,\,error}$), which includes said error included in said at least one error.

15. The system according to claim 14, wherein said system is on board said vehicle.

* * * * *